(12) United States Patent
Fukuchi et al.

(10) Patent No.: US 9,686,019 B2
(45) Date of Patent: *Jun. 20, 2017

(54) COHERENT OPTICAL RECEIVER, DEVICE AND METHOD FOR DETECTING INTER-LANE SKEW IN COHERENT OPTICAL RECEIVER

(75) Inventors: Kiyoshi Fukuchi, Tokyo (JP); Junichi Abe, Tokyo (JP); Wakako Yasuda, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/995,279

(22) PCT Filed: Dec. 16, 2011

(86) PCT No.: PCT/JP2011/079972
§ 371 (c)(1),
(2), (4) Date: Jun. 18, 2013

(87) PCT Pub. No.: WO2012/086831
PCT Pub. Date: Jun. 28, 2012

(65) Prior Publication Data
US 2013/0266308 A1    Oct. 10, 2013

(30) Foreign Application Priority Data
Dec. 21, 2010   (JP) .................................. 2010-284309

(51) Int. Cl.
*H04B 10/61* (2013.01)

(52) U.S. Cl.
CPC .................. *H04B 10/616* (2013.01)

(58) Field of Classification Search
USPC ............................. 398/16, 25, 31, 203–206
See application file for complete search history.

(56) References Cited

U.S. PATENT DOCUMENTS 8,670,678 B2    3/2014   Sakamoto et al.
2006/0285855 A1*  12/2006  Sun et al. ..................... 398/155
(Continued)

FOREIGN PATENT DOCUMENTS

JP    2010-028470    2/2010
JP    2010-193204    9/2010
(Continued)

OTHER PUBLICATIONS

International Search Report, PCT/JP2011/079972, Mar. 19, 2012.
(Continued)

*Primary Examiner* — David Payne
*Assistant Examiner* — Casey Kretzer
(74) *Attorney, Agent, or Firm* — Young & Thompson (57) ABSTRACT

The disclosed coherent optical receiver includes a local light source; a 90-degree hybrid circuit; an optoelectronic converter; an analog-to-digital converter; a skew addition unit; and a FFT operation unit. The 90-degree hybrid circuit makes multiplexed signal light interfere with local light from the local light source, and outputs multiple optical signals separated into a plurality of signal components. The optoelectronic converter detects the optical signal and outputs a detected electrical signal. The analog-to-digital converter digitizes the detected electrical signal and outputs a detected digital signal. The skew addition unit adds to the detected digital signal an additional skew amount whose absolute value is equal to, whose sign is opposite to a skew amount of a difference in propagation delay in each lane connected to each output channel of the 90-degree hybrid circuit. The FFT operation unit performs a fast Fourier transform on the output from the skew addition unit.

14 Claims, 8 Drawing Sheets

(56) References Cited

U.S. PATENT DOCUMENTS

2010/0209121 A1* 8/2010 Tanimura ................... 398/202
2011/0002689 A1 1/2011 Sano et al.

FOREIGN PATENT DOCUMENTS

| JP | 2010-226254 | 10/2010 | | |
|----|----|----|----|----|
| JP | 2011-199687 | 10/2011 | | |
| WO | WO 2009/104758 | 8/2009 | | |
| WO | WO 2010119576 A1 * | 10/2010 | ............. | H04B 10/08 |

OTHER PUBLICATIONS

M.G. Taylor, "Coherent Detection Method Using DSP for Demodulation of Signal and Subsequent Equalization of Propagation Impairments", IEEE Photonics Technology Letters, vol. 16, No. 2, Feb. 2004, p. 674-676.

JP Office Action, dated Jul. 21, 2015; Application No. 2012-549908, with partial English translation.

* cited by examiner

PRIOR ART

COHERENT OPTICAL RECEIVER, DEVICE AND METHOD FOR DETECTING INTER-LANE SKEW IN COHERENT OPTICAL RECEIVER

TECHNICAL FIELD

The present invention relates to coherent optical receivers, devices and methods for detecting inter-lane skew in coherent optical receivers, and, in particular, to a coherent optical receiver which receives polarization multiplexing optical signals by means of coherent detection and digital signal processing, and to a device and a method for detecting inter-lane skew in the coherent optical receiver.

BACKGROUND ART

The data capacity in the networks has been increased year by year due to the wide spread of the Internet. In the trunk line connecting metropolitan areas, the optical transmission link whose transmission capacity per one channel is 10 Gb/s or 40 Gb/s has already been introduced. The On-Off-Keying (OOK) is employed as a modulation scheme in 10 Gb/s transmission. Although the OOK scheme is also employed in 40 Gb/s transmission, the transmission characteristics are greatly influenced by the chromatic dispersion due to the narrow optical pulse width of 25 ps in the direction of time axis. Therefore, the OOK scheme is unsuitable for long-haul transmission in the transmission capacity over 40 Gb/s. For that reason, the multilevel modulation scheme using phase modulation and the polarization multiplexing scheme have been adopted, and the Dual Polarization Quadrature Phase Shift Keying (DP-QPSK) scheme is mainly employed for 100 Gb/s class transmission systems.

Figure 9:
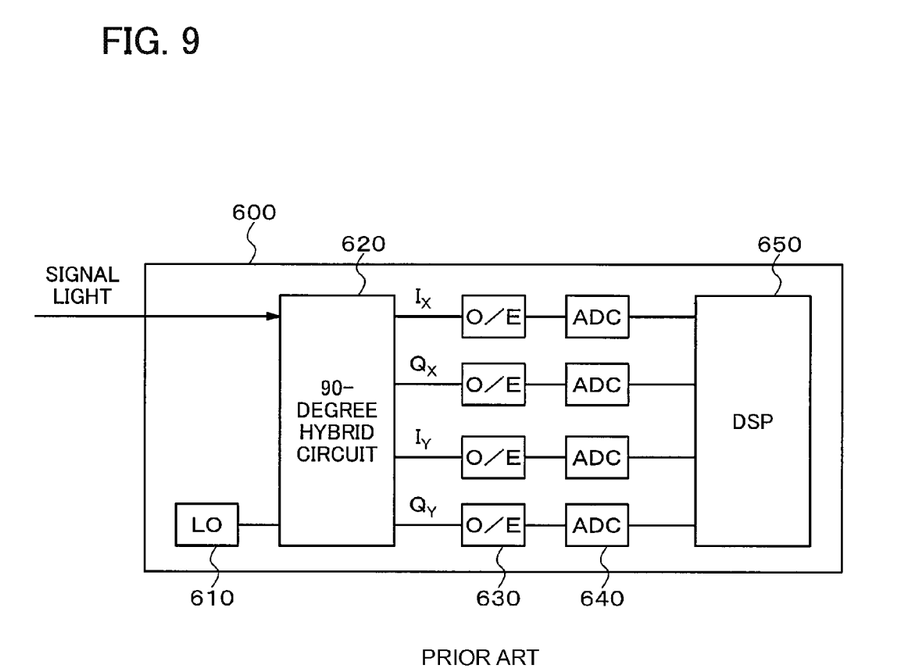
FIG. 9 is a block diagram showing the configuration of a related coherent optical receiver.

The optical signals modulated by DP-QPSK scheme in a transmitter are received and demodulated by a coherent optical receiver (refer to Non Patent Literature 1, for example). FIG. 9 shows an example of the configuration of a related coherent optical receiver. The related coherent optical receiver 600 includes a local light source 610, a 90-degree hybrid circuit (90-deg hybrid) 620, an optoelectronic converter (O/E) 630, an analog-to-digital converter (ADC) 640, and a digital signal processing unit (DSP) 650.

Signal light and local light can be represented by the following formulae as a single polarization signal, respectively.

$$S(t) = \exp[j\omega t] \quad (1)$$

$$L(t) = \exp[j(\omega - \Delta\omega)t] \quad (2)$$

Here, $\Delta\omega$ represents a frequency offset between the signal light and the local light. The signal light and the local light are input into the 90-degree hybrid circuit (90-deg hybrid) 620, passing through an optical interference system, and converted into electrical signals by the optoelectronic converters (O/E) 630, each of which is composed of differentially configured photodiodes. At this time, the outputs represented by the following formulae (3) and (4) are obtained respectively from the transmission lines of an $I_X$ lane and a $Q_X$ lane which are connected to the output channels ($I_X$ and $Q_X$) of the 90-degree hybrid circuit (90-deg hybrid) 620 (hereinafter, referred to as "lane").

$$Ix(t) = \cos(\Delta\omega t) \quad (3)$$

$$Qx(t) = \sin(\Delta\omega t) \quad (4)$$

In the case of a polarization multiplexed signal, the signal light S (t) is expressed as $S(t) = E_X + E_Y$, the cosine components of the mixed signal of $E_X + E_Y$ are output to the $I_X$ lane and the $I_Y$ lane, and the sine components of the mixed signal of $E_X + E_Y$ are output to the $Q_X$ lane and the $Q_Y$ lane.

The signal output from each lane is AD converted by the analog-to-digital converter (ADC) 640, and then input into the digital signal processing unit (DSP) 650. The digital signal processing unit (DSP) 650 demultiplexes inputted signals to $E_X$ signal and $E_Y$ signal by polarization demultiplexing processing, and demodulates the signals of $E_X$ and $E_Y$ into four levels by phase estimation processing.

In this way, the DP-QPSK signal can be demodulated by using the coherent optical receiver.

Non Patent Literature 1: M. G. Taylor, "Coherent Detection Method Using DSP for Demodulation of Signal and Subsequent Equalization of Propagation Impairments", IEEE Photonics Technology Letters, vol. 16, No. 2, February 2004, p. 674-676

DISCLOSURE OF INVENTION

Problem to be Solved by the Invention

The expressions of the signals in the above-described formulae (3) and (4) are true only if, in the coherent optical receiver 600, all lengths of four lanes from the outputs of the 90-degree hybrid circuit 620 to the inputs of the analog-to-digital converters 640 are equal. However, it is difficult to make precisely equal the length between those four channels, that is, the length of optical fiber cables from the output of the 90-degree hybrid circuit 620 to the inputs of the optoelectronic converters 630, and the length of coaxial wires from the outputs of the optoelectronic converters 630 to the inputs of the analog-to-digital converters 640.

Here, if the lengths of the four lanes are not equal, there arises a delay in signal transmission, that is, a skew. If there exists a skew T in the $Q_X$ lane, to which the signal $Q_X$ expressed by the above-described formula (4) is output, against the $I_X$ lane to which the signal $I_X$ expressed by the above-described formula (3) is output, the above-described formula (4) is changed into the following formula (5).

$$Q_X(t) = \sin(\Delta\omega(t - T)) \quad (5)$$

If such an inter-lane skew arises, it becomes difficult to perform the polarization demultiplexing processing and the phase estimation processing, and sufficient performance cannot be achieved. As described above, in a coherent optical receiver, there is a problem that sufficient demodulation becomes impossible and consequently receiving performance deteriorates if a skew between the lanes arises.

The object of the present invention is to provide a coherent optical receiver and a device and a method for detecting inter-lane skew in the coherent optical receiver which solve the problem mentioned above that in a coherent optical receiver, sufficient demodulation becomes impossible and consequently receiving performance deteriorates if an inter-lane skew arises.

Means for Solving a Problem

A coherent optical receiver according to an exemplary aspect of the present invention includes a local light source; a 90-degree hybrid circuit; an optoelectronic converter; an analog-to-digital converter; a skew addition unit; and a FFT operation unit, wherein the 90-degree hybrid circuit makes multiplexed signal light interfere with local light from the local light source, and outputs a plurality of optical signals separated into a plurality of signal components; the optoelectronic converter detects the optical signal and outputs a detected electrical signal; the analog-to-digital converter digitizes the detected electrical signal and outputs a detected digital signal; the skew addition unit adds to the detected digital signal an additional skew amount whose absolute value is equal to, whose sign is opposite to a skew amount of a difference in propagation delay in each lane connected to each output channel of the 90-degree hybrid circuit; and the FFT operation unit performs a fast Fourier transform process on a signal output from the skew addition unit.

A device for detecting inter-lane skew in a coherent optical receiver according to an exemplary aspect of the present invention includes a coherent optical receiver; a test light source; and a control block, wherein the coherent optical receiver includes a local light source, a 90-degree hybrid circuit, an optoelectronic converter, an analog-to-digital converter, a skew addition unit, and a FFT operation unit, wherein the 90-degree hybrid circuit makes multiplexed signal light interfere with local light from the local light source, and outputs a plurality of optical signals separated into a plurality of signal components; the optoelectronic converter detects the optical signal and outputs a detected electrical signal; the analog-to-digital converter digitizes the detected electrical signal and outputs a detected digital signal; the skew addition unit adds a predetermined additional skew amount to the detected digital signal; the FFT operation unit outputs FFT data obtained by performing a fast Fourier transform process on a signal output from the skew addition unit; and the control block calculates, from the FFT data, a skew amount of a difference in propagation delay in each lane connected to each output channel of the 90-degree hybrid circuit, and sets a value, whose absolute value is equal to, whose sign is opposite to the skew amount, for an additional skew amount in the skew addition unit.

A method for detecting inter-lane skew in a coherent optical receiver according to an exemplary aspect of the present invention includes the steps of: making test light from a test light source interfere with local light from a local light source, and outputting a plurality of optical signals separated into a plurality of signal components; detecting the optical signal and outputting a detected electrical signal; digitizing the detected electrical signal and outputting a detected digital signal; performing a fast Fourier transform process on the detected digital signal; calculating an absolute value of a skew amount corresponding to a difference in propagation delay between the plurality of signal components from the results of the fast Fourier transform process; and determining a sign of the skew amount.

Effect of the Invention

According to the coherent optical receiver by the present invention, even if a skew arises between the lanes, it becomes possible to achieve sufficient demodulation and thus to suppress deterioration of reception performance.

DESCRIPTION OF EMBODIMENTS

An exemplary embodiment of the present invention will be described with reference to drawings below.

Figure 1:
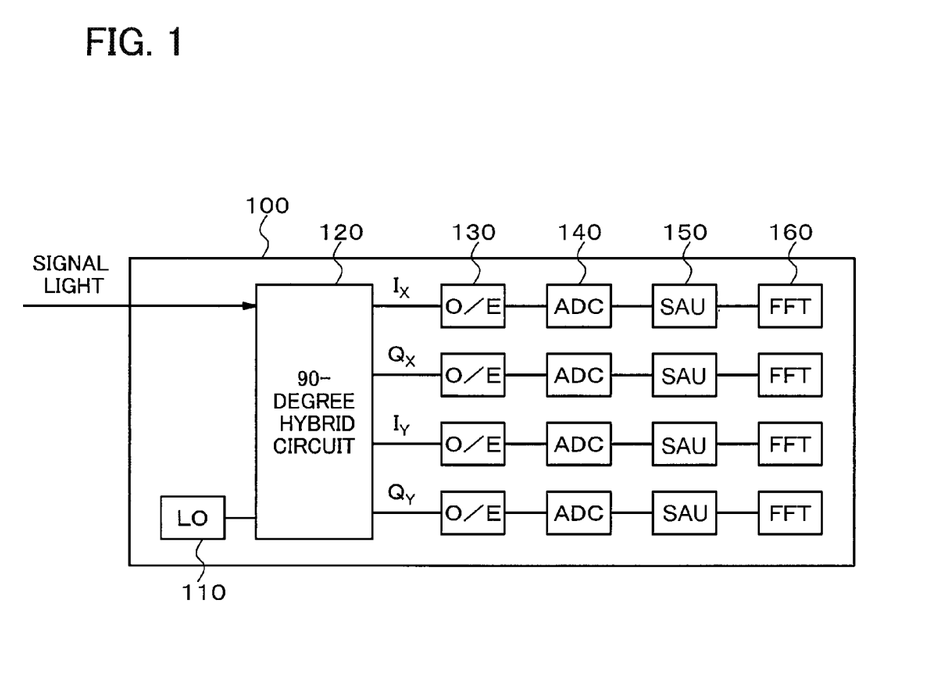
FIG. 1 is a block diagram showing the configuration of a coherent optical receiver in accordance with an exemplary embodiment of the present invention.

FIG. 1 is a block diagram showing the configuration of a coherent optical receiver 100 in accordance with the exemplary embodiment of the present invention. The coherent optical receiver 100 includes a local light source (LO) 110, a 90-degree hybrid circuit (90-deg hybrid) 120, an optoelectronic converter (0/E) 130, and an analog-to-digital converter (ADC) 140. And the coherent optical receiver 100 includes a skew addition unit (SAU) 150 and an FFT operation unit (FFT) 160.

The 90-degree hybrid circuit (90-deg hybrid) 120 makes multiplexed signal light (Signal) interfere with the local light from the local light source 110, and outputs a plurality of optical signals separated into each signal component. In the present exemplary embodiment, the case will be described in which DP-QPSK modulation scheme is used. Accordingly, the 90-degree hybrid circuit 120 outputs four-wave optical signals including four-channel signal components respectively which are composed of in-phase components ($I_X$ and $I_Y$) and quadrature-phase components ($Q_X$ and $Q_Y$) for each of two polarizations (X polarization and Y polarization).

The optoelectronic converter (ME) 130 detects the respective four-wave optical signals output from the 90-degree hybrid circuit 120, and outputs four couples of detected electrical signals. The analog-to-digital converter (ADC) 140 digitizes each detected electrical signal, and outputs the detected digital signals.

The skew addition unit 150 compensates the difference in propagation delay in each lane connected to each output channel of the 90-degree hybrid circuit 120 (hereinafter, referred to as "skew"). That is, the skew addition unit 150 adds to the detected digital signal an additional skew amount whose absolute value is equal to, whose sign is opposite to the skew amount in each lane, and outputs it to the FFT operation unit (FFT) 160. The FFT operation unit 160 performs a fast Fourier transform (hereinafter, referred to as "FFT") process on the signals input from the skew addition unit 150, and outputs FFT data.

Figure 2:
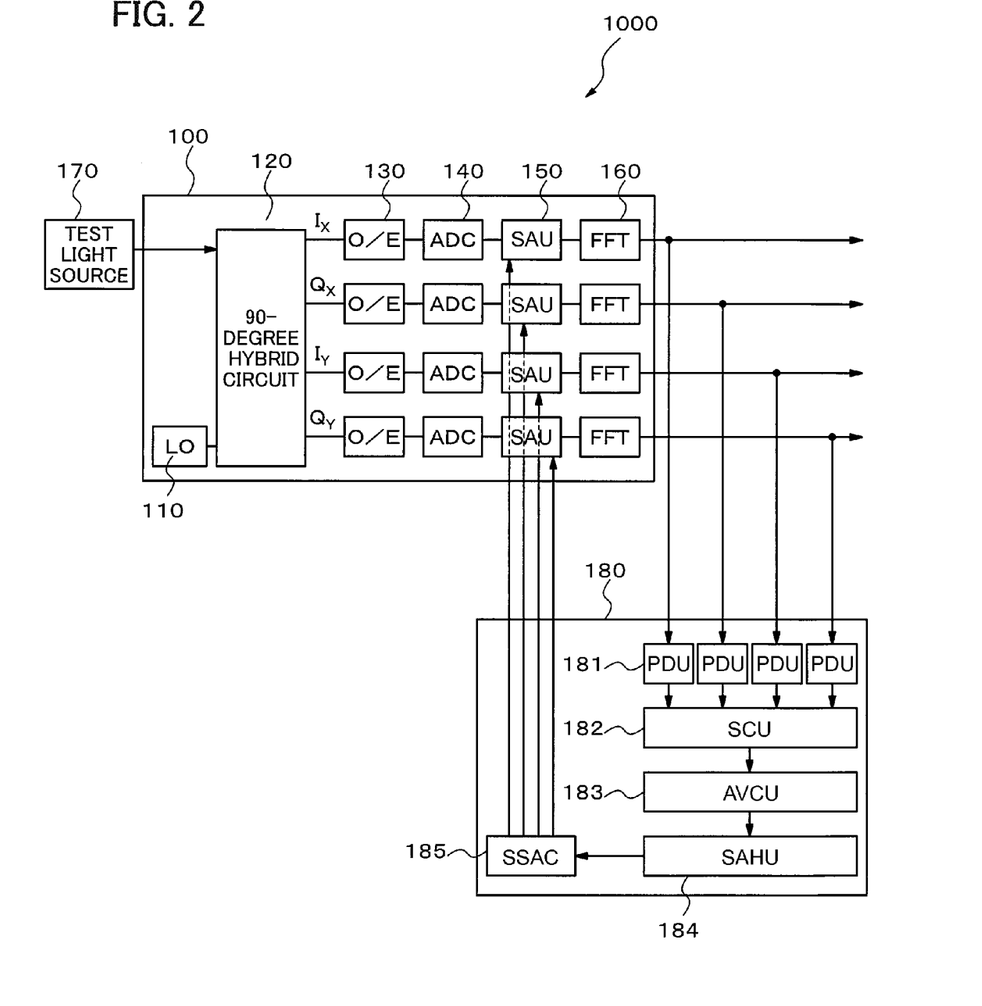
FIG. 2 is a block diagram showing the configuration of a device for detecting inter-lane skew in a coherent optical receiver in accordance with an exemplary embodiment of the present invention.

Next, a device for detecting inter-lane skew in the coherent optical receiver 100 will be described using FIG. 2. As shown in FIG. 2, a test light source 170 and a control block 180 are connected to the coherent optical receiver 100, and thereby a device for detecting inter-lane skew in the coherent optical receiver 1000 is configured.

The control block 180 includes a peak detection unit (PDU) 181, a skew calculation unit (SCU) 182, an absolute value calculation unit (AVCU) 183, a skew amount holding unit (SAHU) 184, and a set skew amount controller (SSAC) 185. The FFT data which the FFT operation unit (FFT) 160 outputs are input into four sets of the peak detection units 181, respectively. The peak detection unit 181 calculates peak information including a frequency corresponding to a peak included in the FFT data and information on the phase angle at the frequency and outputs the peak information to the skew calculation unit 182.

The skew calculation unit 182 calculates skews on the basis of the information on the calculated frequency and phase angle, and outputs them to the absolute value calculation unit 183. The absolute value calculation unit 183 calculates an absolute value of the skew. The skew amount holding unit 184 inputs the output of the absolute value calculation unit 183 and holds the calculated skew amount. And the sign of the skew is determined by comparing the input skew amount with the holding skew amount. The information in the skew amount holding unit 184 is notified to the set skew amount controller 185 which sets the skew amount in the skew addition unit 150. The set skew amount controller 185 sets a value, whose absolute value is equal to, whose sign is opposite to the calculated skew, for an additional skew amount in the skew addition unit 150. The skew addition unit 150 adds the additional skew amount to the detected digital signal. Here, the control block 180 can be configured by means of a specific signal processing circuit, and also configured by means of a central processing unit (CPU) and programs for making the CPU execute the processing.

Figure 3:
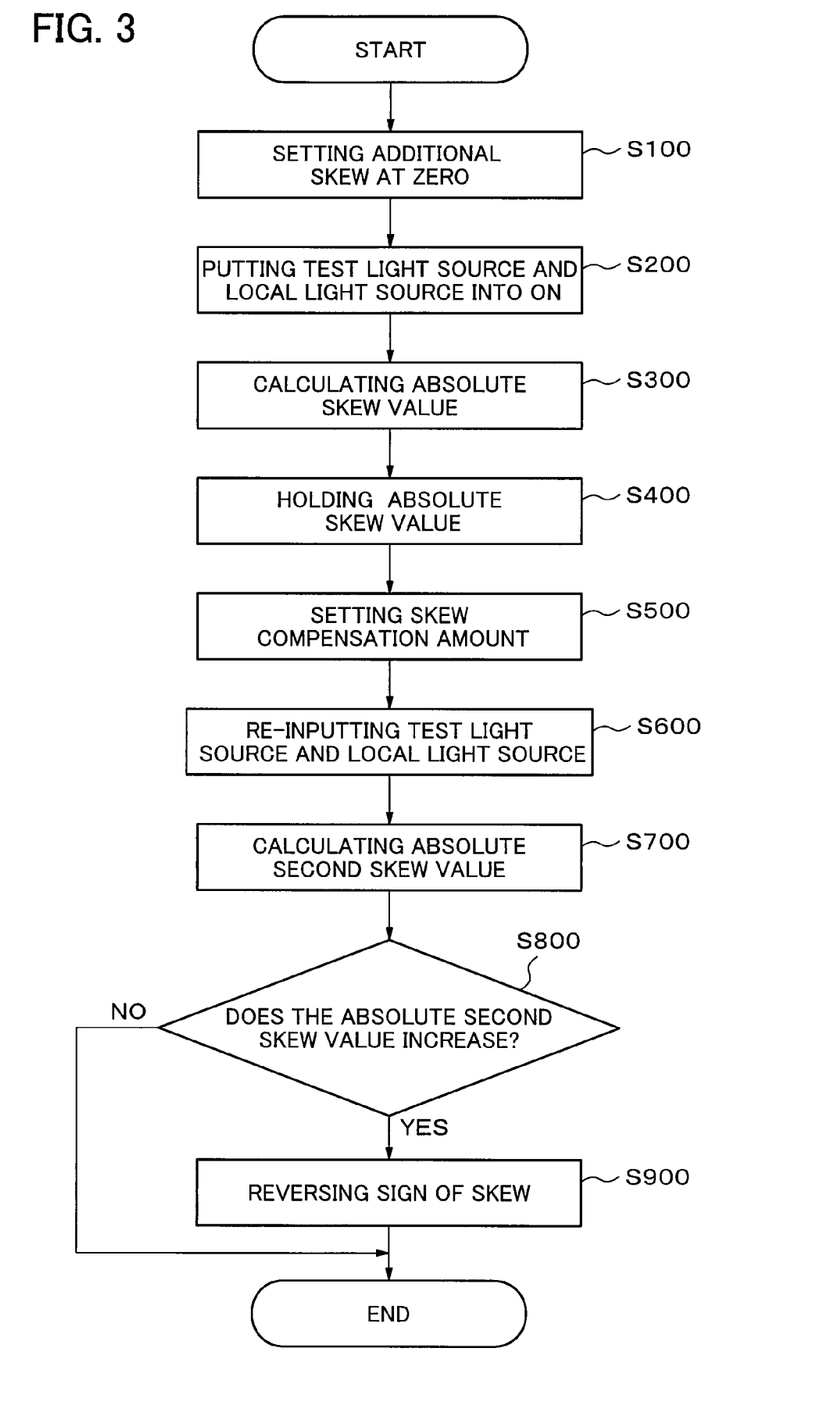
FIG. 3 is a flowchart illustrating a method for detecting inter-lane skew in a coherent optical receiver in accordance with an exemplary embodiment of the present invention.

Next, a method for detecting inter-lane skew in the coherent optical receiver 100 will be described with reference to a flowchart shown in FIG. 3. First, at the start of skew detection, the set skew amount controller 185 sets a set skew amount at zero (0), and notifies it to the skew addition unit 150. The skew addition unit 150 sets an additional skew amount at zero (0) (step S100).

As shown in FIG. 2, a test light source 170 is connected to a signal port of the 90-degree hybrid circuit 120, and the local light source 110 is connected to its local port. Following step S100, the test light source 170 and the local light source 110 are put into an operating state (ON), and each output light is input into the 90-degree hybrid circuit 120 (step S200). Here, both of the output light from the test light source 170 and the local light source 110 is coherent light having constant intensity without modulation. And then, an absolute value of an inter-lane skew in the coherent optical receiver 100 is calculated (step S300).

Figure 4:
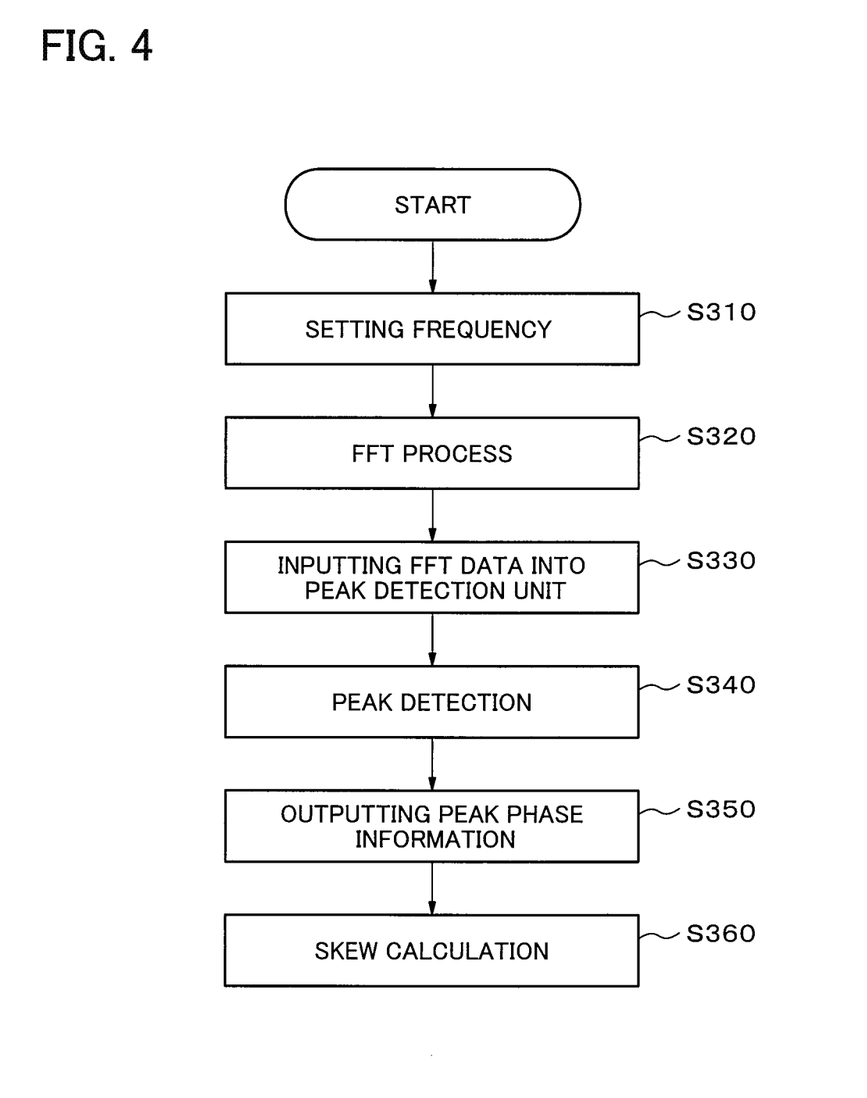
FIG. 4 is a flowchart illustrating a method for calculating the absolute value of inter-lane skew in a coherent optical receiver in accordance with an exemplary embodiment of the present invention.

The calculation of the absolute value of the skew will be described in detail using a flowchart shown in FIG. 4. In calculating the absolute value of the inter-lane skew, first, a frequency of output light from the test light source 170 or the local light source 110 is set so that a frequency difference $\Delta\omega$ may arise between the output light from the test light source 170 and that from the local light source 110 (step S310). At this time, as can be seen from formula (2), $\Delta\omega$ becomes a positive value if the frequency of the test light is higher than that of the local light. Since the value of the frequency difference $\Delta\omega$ is calculated accurately in the peak detection unit 181 as mentioned below, it is only necessary here to set the value so that an approximate frequency difference may arise. For example, it is possible to set a value lower than the band of the optoelectronic converter 130 and the analog-to-digital converter 140. Specifically, if using for a skew estimation in a coherent optical receiver for 100 Gb/s, it is only necessary to set a frequency difference in the range of a few GHz.

The test light source 170 and the local light source 110 are only necessary to be devices generating non-modulated light with a single mode. If a measurement of high precision is performed, it is desirable to use a device having a narrow-linewidth light source such as an external mirror laser. It is also quite possible to use a semiconductor laser whose light source linewidth is less than or equal to a megahertz (MHz). The intensity of the output light from each light source is only necessary to be an intensity of the light whose amplitude input into the analog-to-digital converter 140 becomes the appropriate value.

The output light from the test light source 170 interferes with the output light from the local light source 110 in the 90-degree hybrid circuit 120, and a beat signal with a frequency Aω is output. At that time, each beat signal light, which is output from each of the $I_X$ lane, $Q_X$ lane, $I_Y$ lane, and $Q_Y$ lane corresponding to output channels of the 90-degree hybrid circuit 120, is input into the optoelectronic converter 130 and converted into an electrical signal. Each output signal from the optoelectronic converter 130 is represented by the following formulae from (6) to (9).

$$I_X \text{ lane: } \cos(\Delta\omega t + \phi_{IX}) \qquad (6)$$

$$Q_X \text{ lane: } \sin(\Delta\omega t + \phi_{QX}) \qquad (7)$$

$$I_Y \text{ lane: } \cos(\Delta\omega t + \phi_{IY}) \qquad (8)$$

$$Q_Y \text{ lane: } \sin(\Delta\omega t + \phi_{QY}) \qquad (9)$$

Here, each of $\phi_{IX}$, $\phi_{QX}$, $\phi_{IY}$, and $\phi_{QY}$ is a phase which arises due to the skew in each lane. The output signals of the optoelectronic converters 130 are converted into digital signals by four sets of analog-to-digital converter 140. The output of the digital signal at that time obtains accuracy of 8 bits if 8-bit analog-to-digital converter is used, for example. However, a bit number of the analog-to-digital converter is not limited to 8 bits.

Since the skew addition unit 150 sets the additional skew amount at zero (0), the output digital signal passes through the skew addition unit 150 without change and is stored in the real part on the input signal side of the FFT operation unit 160. At that time, the imaginary part on the input signal side of the FFT operation unit 160 is set at zero (0). The FFT operation unit 160 performs a fast Fourier transform (FFT) process on these complex input data (step S320). As a result, each of matrices $\hat{I}_x$, $\hat{Q}_x$, $\hat{I}_y$, and $\hat{Q}_y$, having N sets of data, is obtained as each output of the FFT operation unit 160. Here, "N" represents an order of FFT and it is preferable from a view of simplifying a circuit configuration for the value of N to be a power of 2 such as 1024 or 4096.

The FTT data $\hat{I}_x$, $\hat{Q}_x$, $\hat{I}_y$, and $\hat{Q}_y$ of the outputs from the FFT operation unit 160 are input into four sets of peak detection unit 181 (step S330). The peak detection unit 181 extracts the data $\hat{I}_x(N_{max})$ having the maximum magnitude from N points, for example, 4096 points of the FFT data $\hat{I}_x$. And the frequency (peak frequency) $f_{max}$ and the phase (peak phase) $\phi_{max}$ at that point are derived by calculation (step S340).

Figure 5:
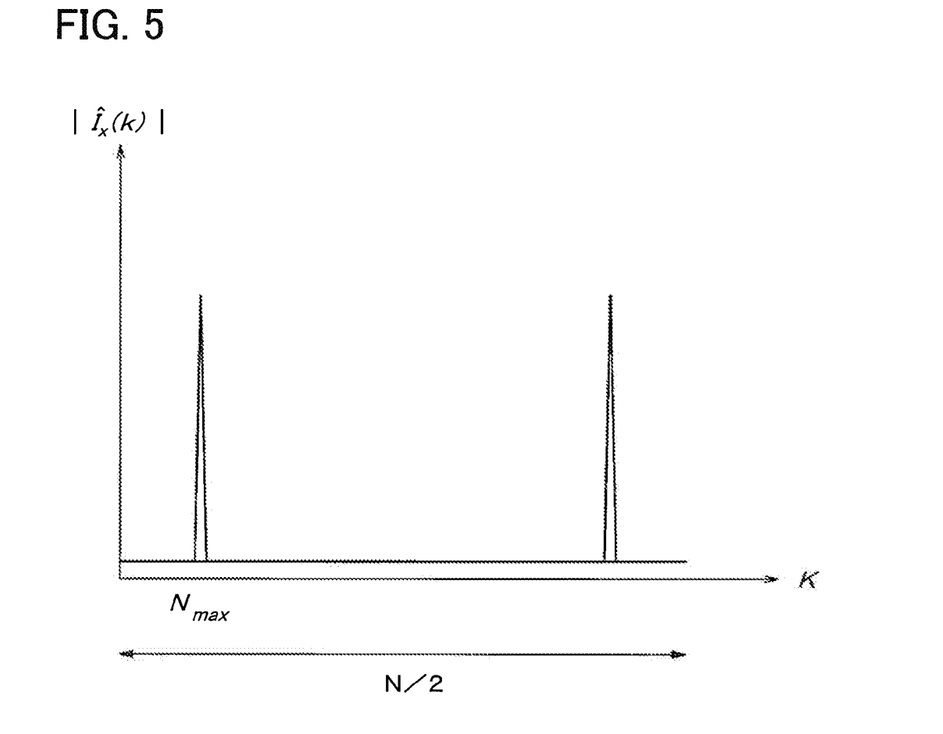
FIG. 5 is a diagrammatic illustration where absolute values of FFT data are plotted against indices, which are derived by an FFT operation unit in a coherent optical receiver in accordance with an exemplary embodiment of the present invention.

The peak frequency $f_{max}$ is calculated as follows. An absolute value of the FFT data within the range that an index k is equal to any one of 1 to N/2 is calculated for N pieces of complex FTT data from the FFT operation unit 160, and the index $N_{max}$ at which the absolute value of the FFT data becomes maximum is obtained. In FIG. 5, an example of a diagrammatic illustration is shown where the FFT data $I\hat{}_x(k)$ are plotted against the index k. Here, since the FFT data $I\hat{}_x(k)$ are composed of complex numbers, the vertical axis of the figure represents the magnitude of $I\hat{}_x(k)$, $|I\hat{}_x(k)|$, and the horizontal axis represents the index k of the FFT data. As shown in FIG. 5, if $|I\hat{}_x|$ has a peak at the index $N_{max}$, the peak detection unit 181 detects the $I\hat{}_x(N_{max})$.

Here, $f_T$ representing a sampling frequency in the analog-to-digital converter (ADC) 140, a frequency interval of the FFT process is equal to $f_T/N$. Therefore, the peak frequency $f_{max}$ at the time when $I\hat{}_x(N_{max})$ becomes a peak is equal to $N_{max}f_T/N$. On the other hand, since the output light from the test light source 170 is not modulated, each input signal into the FFT operation unit 160 is a sine wave with frequency difference $\Delta\omega$. Accordingly, the FTT data output from the FFT operation unit 160 has a spectrum including a peak of an absolute value at the $\Delta\omega$. As mentioned above, the frequency difference $\Delta\omega$ is obtained by the following formula using the index $N_{max}$ obtained here and a sampling frequency $f_T$ of the digital-to-analog converter.

$$\Delta\omega = 2 \times \pi \times f_T / N \times N_{max} \qquad (10)$$

Here, $\pi$ represents the circular constant.

And then, peak phase information $\phi_{max}$=angle ($I\hat{}_x(N_{max})$) is calculated by using the FFT data $I\hat{}_x(N_{max})$ at the peak frequency $f_{max}$. The peak phase information $\phi_{max}$ is calculated for each of four output lanes of the 90-degree hybrid circuit 120. The peak detection unit 181 outputs, to the skew calculation unit 182, $\phi_{IX}$, $\phi_{QX}$, $\phi_{IY}$, and $\phi_{QY}$ which are peak phase information calculated for each output lane (step S350).

The skew calculation unit 182 calculates a skew by using the peak phase information (step S360). For example, using the $I_X$ lane as a reference, a phase difference in each lane of $Q_X$, $I_Y$, and $Q_Y$ is obtained as follows.

$\phi_{IX}=0$ $\phi_{QX}-\phi_{IX}$ $\phi_{IY}-\phi_{IX}$ $\phi_{QY}-\phi_{IX}$

Figure 6:
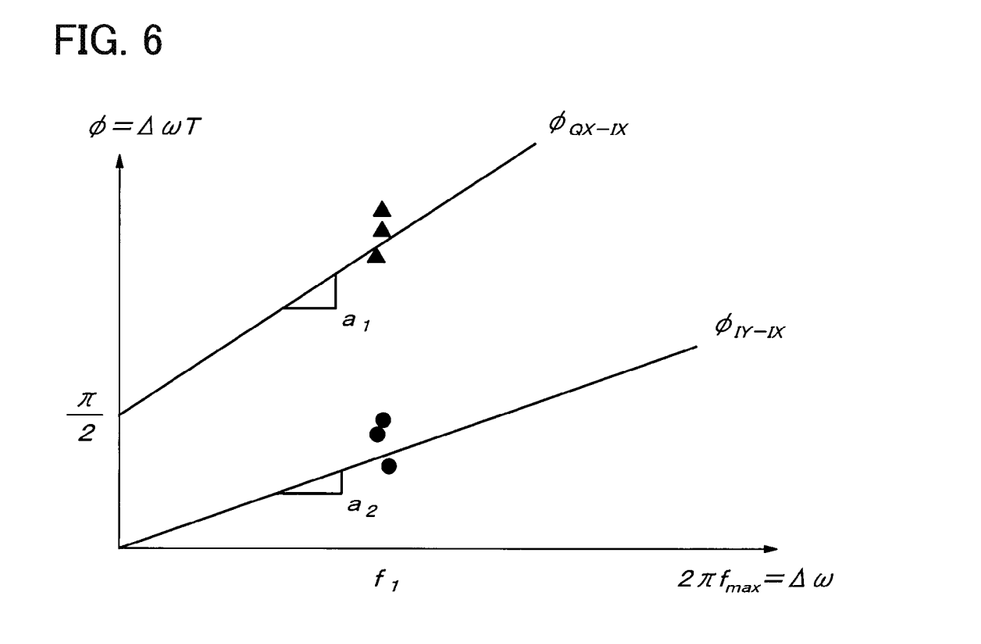
FIG. 6 is a diagrammatic illustration plotting the relations between phase difference and angular frequency at a $Q_X$ port and an $I_Y$ port of a coherent optical receiver in accordance with an exemplary embodiment of the present invention.

FIG. 6 shows a diagrammatic illustration plotting the relation between each phase differences of $\phi_{QY-IX}$ and $\phi_{IY-IX}$ in the $Q_X$ lane and the $I_Y$ lane using the $I_X$ lane as a reference and angular frequency $2\pi f_{max}$ (=$\Delta\omega$). Here, if a 90-degree error between the I-lane and the Q-lane can be neglected, approximation formulae represented by linear functions can be calculated for the $Q_X$ lane and the $I_Y$ lane respectively, as follows.

$\phi_{QX-IX}=a_1(2\pi f)+\pi/2$ $\phi_{IY-IX}=a_2(2\pi f)$

An approximation formula can be similarly calculated for the $Q_Y$ lane as follows.

$\phi_{QY-IX}=a_3(2\pi f)+\pi/2$

Each gradient of $a_1$, $a_2$, and $a_3$ obtained here represents a skew against the $I_X$ lane. That is to say, the skew between the $I_X$ lane and the $Q_X$ lane $\Delta t(Q_X-I_X)$ is obtained by the following formula.

$$\Delta t(Q_X-I_X)=|\phi_{PQ}-\phi_{IX}|/\Delta\omega \qquad (11)$$

In the same way, it is possible to obtain the skew between the $I_X$ lane and the $I_Y$ lane $\Delta t(I_Y-I_X)$ and the skew between the $I_X$ lane and the $Q_Y$ lane $\Delta t(Q_Y-I_X)$ by using peak phase information $\phi_{IX}$, $\phi_{QX}$, $\phi_{IY}$, and $\phi_{QY}$. Thus, the skew calculation unit 182 calculates a skew using the $I_X$ lane as a reference, and the absolute value calculation unit 183 calculates an absolute value of the skew (step S300 in FIG. 3).

It is possible to reduce the influence of a measurement error and improve the calculation accuracy by repeating the process for calculating an absolute value of the skew (step S300) several times, obtaining a number of absolute values of the skew, and averaging them. Even if there is a 90-degree error between the I lane and the Q lane in the 90-degree hybrid circuit 120, it is possible to calculate the absolute value of the skew with a high degree of accuracy by performing a peak detection measurement for several frequency differences $\Delta\omega$.

Here, for the above-mentioned process of calculating the skew, it is necessary to have obtained accurately the value including its sign of the frequency difference $\Delta\omega$ between the output light from the test light source 170 and that from the local light source 110. That is to say, it is necessary to have already found the high-low level of the frequency between the output light from the test light source 170 and that from the local light source 110 in some way. In order to measure such high-low level of the frequency, it is necessary to control the frequency difference between the test light and the local light so that it may become a very small value, for example, a few GHz, to a few hundred of THz which is an average frequency of light. It is required to use a wavelength tunable light source which can control the wavelength with a high degree of accuracy or a measuring instrument which can measure a wavelength with a high degree of accuracy. However, there is a problem that the cost for evaluation increases because these devices are expensive, and the evaluation procedure is complicated because the procedure for wavelength measurement and wavelength control is added.

In a light source used for coherent optical communication, in order to stabilize a wavelength at a specific value, a method for stabilizing a wavelength by fluctuating the wavelength slightly and detecting the fluctuation is adopted. As for such light source device, it could be that a minute fluctuation range exceeds a frequency difference necessary for a skew detection, in which case a phenomenon arises that the frequency difference $\Delta\omega$ repeats the sign inversion with time. In such case, it is possible to measure correctly the absolute value of the frequency difference $\Delta\omega$ at the moment when a skew detection is performed, but it is very difficult to identify the sign of $\Delta\omega$.

However, according to the present exemplary embodiment, because it is possible to detect the sign of the frequency difference $\Delta\omega$ between the test light and the local as described below, it is possible to suppress the increase in cost of the inter-lane skew detection in a coherent optical receiver and simplify the detection procedure.

Referring to FIG. 2 and FIG. 3 again, the absolute value calculation unit 183 outputs absolute values of three skew amounts $\Delta t(Q_X-I_X)$, $\Delta t(I_Y-I_X)$, and $\Delta t(Q_Y-I_X)$ using the $I_X$ lane as a reference to the skew amount holding unit 184, and the skew amount holding unit 184 holds the absolute values of these skew amounts (step S400).

Next, the skew amount holding unit 184 notifies the set skew amount controller 185 of the absolute values of the skew amount which it holds currently. The set skew amount controller 185 sets a skew compensation amount whose magnitude is the same as that of the absolute value of the notified skew amount in the skew addition unit 150 (step S500). If the sign of a skew arising actually is assumed to be "positive", the sign of the skew compensation amount is made "negative" opposite to it. In this case, specifically, each value described below is set in the skew addition unit 150 in each lane as the skew compensation amount.

$Q_X$ lane: $-\Delta t(Q_X-I_X)$
$I_Y$ lane: $-\Delta t(I_Y-I_X)$
$Q_Y$ lane: $-\Delta t(Q_Y-I_X)$ Here, since the $I_X$ lane is a reference lane for a skew calculation, a value of zero (0) is set at the skew addition unit in the $I_X$ lane.

After having set the skew compensation amount, the test light and the local light are input again (step S600), and the second round of skew detection is performed. This skew detection process follows a similar procedure to that of the last process, that is, the skew calculation unit 182 calculates the second skew, and the absolute value calculation unit 183 outputs the absolute value of the second skew (step S700). At that time, the frequency difference $\Delta\omega$ between the test light and the local light need not be the same value as that in the first process, and it is only necessary for the frequency difference to arise.

In the second skew detection process, the skew amount holding unit 184 performs the operation different from that in the first process. The skew amount holding unit 184 compares the skew amount being held with the absolute value of the second skew notified from the absolute value calculation unit 183 in each lane (step S800). If the second skew increases (step S800/YES), the skew amount holding unit 184 determines that the sign of the skew set in the first round has been wrong, and reverses the sign of the skew being held (step S900). On the other hand, if the notified absolute value of the second skew decreases or becomes equal to zero (0) compared to the absolute value of the skew being held (step S800/NO), it is determined that the set skew amount is correct, and the sign of the skew being held is kept without change.

By the processes described above, the value stored in the skew amount holding unit 184 becomes a correct skew amount including the sign. In the above-mentioned description, the case is described in which the $I_X$ lane is used as a reference in calculating the skew amount. It is not limited to this, and it is also acceptable to calculate a skew by using as a reference the other lane, that is, the $Q_X$ lane, the $I_Y$ lane, or the $Q_Y$ lane.

In the above-mentioned description, it is described that the sign of the skew arising actually is assumed to be "positive" and the sign of the skew compensation amount is made "negative" opposite to it (step S500). On the contrary, even if the sign of the skew arising actually is assumed to be "negative" and the sign of the skew compensation amount is made "positive" opposite to it, according to the present exemplary embodiment, it is possible to obtain the correct skew amount including the sign. That is to say, as long as the skew compensation amount is equal in magnitude to the absolute value of the skew calculated in the absolute value calculation unit 183, it is possible to make the sign either "positive" or "negative". The additional skew amount, whose absolute value is equal to, whose sign is opposite to, the skew amount calculated here which is correct including the sign, is added to the detected digital signal in the skew addition unit 150. In this way, it is possible to compensate the skew in each lane of the 90-degree hybrid circuit 120.

As mentioned above, in the present exemplary embodiment, a skew is calculated by inputting the test light and the local light first. In the calculation procedure for the skew, a skew is obtained by formula (11) using the value of the peak phase $\phi$ which is calculated from the FTT data obtained by performing the Fourier transform process after converting the output from the 90-degree hybrid circuit into the electrical signal. Since the skew $\Delta t$ is calculated by using the peak phase $\phi$ in the calculation using the formula (11), a frequency "f" at which the peak phase is given is required. The frequency at that time is equal to the frequency difference between the test light and the local light. However, the sign of the frequency difference changes depending on the high-low relationship of the frequency between the test light and the local light. Although the information on the absolute value of the frequency difference can be obtained from FTT data which give a peak level, it is impossible to determine the sign.

Accordingly, in order to remove the indetermination of the sign, the absolute value of the skew derived from formula (11) is calculated first. This makes the information in which the absolute value of the skew value is correct and only its sign is undetermined. Next, the skew value is assumed to be correct, and a skew, whose absolute value is equal to, whose sign is opposite to, the skew value, that is, a negative skew value is input into the skew addition unit as a compensation amount. At that time, if the inter-lane skew value in the coherent optical receiver is positive and correct, the skew is removed by the additional compensation amount. On the other hand, if the inter-lane skew value is negative, the skew amount generated by adding the compensation amount is doubled.

From this, it is possible to determine the sign of the skew by performing the skew measurement again after adding the compensation amount. That is to say, if the absolute value of the measurement result is equal to zero (0) or smaller than the original skew value, it is found that the sign of the skew is positive. On the contrary, if the absolute value of the measurement result becomes larger than the original value, it is found that the sign of the skew is negative.

In this way, it is possible to determine the sign of the skew by means of two processes for the skew measurement, that is, the skew detection process and the verification process in which the compensation amount for detected skew is added. As mentioned above, according to the present exemplary embodiment, it is possible to obtain the correct skew value including its sign without finding the high-low relationship of the frequency between the test light and the local light.

Figure 7:
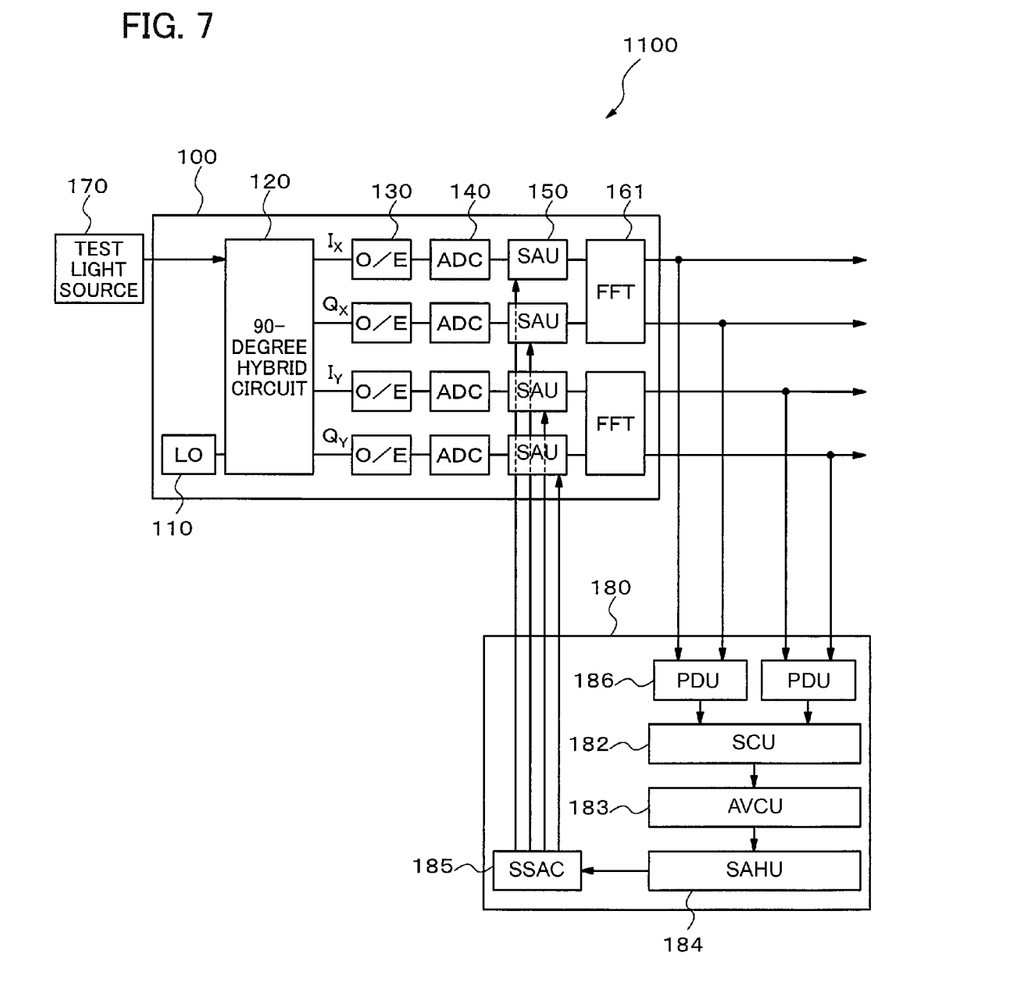
FIG. 7 is a block diagram showing another configuration of a device for detecting inter-lane skew in a coherent optical receiver in accordance with an exemplary embodiment of the present invention.

In the above-mentioned description, as shown in FIG. 2, the device for detecting inter-lane skew in the coherent optical receiver 1000 includes the FFT operation unit (FFT) in each lane corresponding to each output of the 90-degree hybrid circuit 120. However, it is not limited to this, as shown in FIG. 7, it is also acceptable to have a single FFT operation unit (FFT) 161 in the $I_x$ lane and the $Q_x$ lane in common, and have a single FFT operation unit (FFT) 161 in the $I_y$ lane and the $Q_y$ lane in common. That is to say, a device for detecting inter-lane skew in the coherent optical receiver 1100 is also acceptable in which the coherent optical receiver 100 includes two systems of the FFT operation unit (FFT) 161, and corresponding to this, the control block 180 includes two systems of the peak detection unit (PDU) 186.

Here, FFT data are calculated by treating the signal in $I_X$ lane as real part input data into the FFT operation unit (FFT) 161, and treating the signal in $Q_X$ lane as imaginary part input data into the FFT operation unit (FFT) 161. Similarly, FFT data are calculated by treating the signal in $I_Y$ lane as real part input data into the FFT operation unit (FFT) 161, and treating the signal in $Q_Y$ lane as imaginary part input data into the FFT operation unit (FFT) 161. In this case, it is also possible to use the method for detecting inter-lane skew in the coherent optical receiver according to the present exemplary embodiment.

In the device for detecting inter-lane skew in a coherent optical receiver 1100 shown in the FIG. 7, it is difficult to calculate each skew between the IX lane and the IY lane, and between the QX lane and the QY lane. In contrast, in a device for detecting inter-lane skew in a coherent optical receiver 1200 shown in FIG. 8, a switch unit (SW) 162 is disposed between the skew addition unit 150 and the FFT operation unit (FFT) 161 in the QX lane and the QY lane, respectively. By this configuration, it becomes possible to calculate a skew between the IX lane and the IY lane. Here, the switch unit 162 always outputs the value of zero "0" in the non-operating (OFF) state, and outputs an input data without change in the operating (ON) state. The device for detecting inter-lane skew in a coherent optical receiver 1200 includes two systems of the FFT operation unit (FFT) 161 and two systems of the peak detection unit 186.

Figure 8:
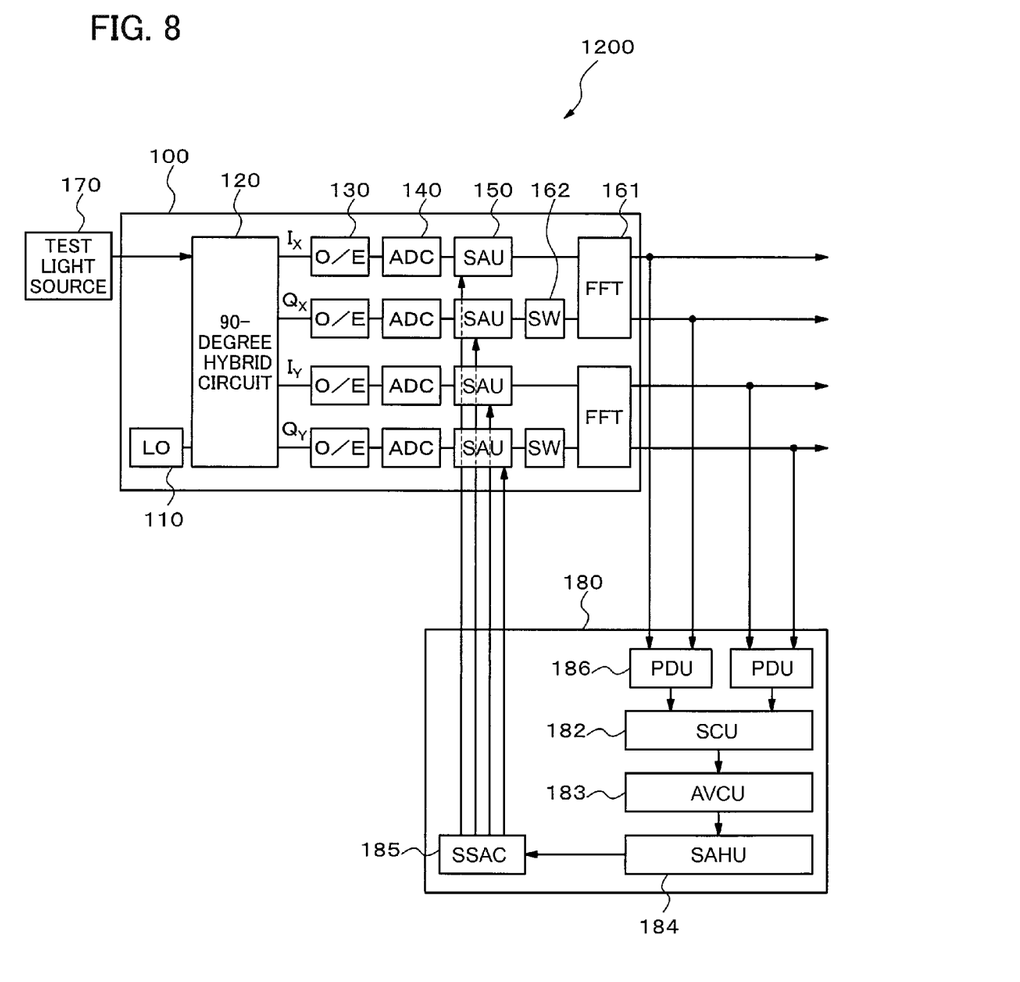
FIG. 8 is a block diagram showing still another configuration of a device for detecting inter-lane skew in a coherent optical receiver in accordance with an exemplary embodiment of the present invention.

Next, the operation of the device for detecting inter-lane skew in a coherent optical receiver 1200 will be described. First, the switch unit 162 is put into an operating (ON) state and an input data is output without change. This enables the device to calculate a skew between the $I_X$ lane and the $Q_X$ lane, and between $I_Y$ lane and the $Q_Y$ lane respectively just like the device for detecting inter-lane skew in a coherent optical receiver 1100 mentioned above.

Next, the switch unit 162 is put into a non-operating (OFF) state. At that time, in the FFT operation unit (FFT) 161 connected to the $I_X$ lane, the detected digital signal is input into a real part of the input signal side and the value of zero (0) is input into an imaginary part. Accordingly, the FFT operation unit (FFT) 161 performs the same operation as the FFT operation unit (FFT) 160 in the device for detecting inter-lane skew in a coherent optical receiver 1000 shown in FIG. 2. Similarly, the FFT operation unit (FFT) 161 connected to the $I_Y$ lane performs the same operation as the FFT operation unit (FFT) 160 in the device for detecting inter-lane skew in a coherent optical receiver 1000 shown in FIG. 2. Therefore, it is possible to obtain a skew between the $I_Y$ lane and the $I_X$ lane from the outputs of these two FFT operation units (FFT) 161 according to the calculation procedure shown in FIG. 4.

As a result, according to the device for detecting inter-lane skew in a coherent optical receiver 1200, it is possible to detect each skew between four lanes even though only two systems of the FFT operation unit (FFT) 161 are included.

As mentioned above, according to the device and the method for detecting inter-lane skew in a coherent optical receiver, it becomes possible to calculate a skew between respective output lanes. That is to say, inputting test light into the signal port of the 90-degree hybrid circuit, observing beat signals of the test light and the local light by the analog-to-digital converter, it is possible to calculate a skew from the phase information obtained by performing the FFT operation. And the coherent optical receiver 100 according to the present exemplary embodiment sets in the skew addition unit 150 the skew compensation amount whose absolute value is equal to, whose sign is opposite to, the skew obtained here. As a result, according to the coherent optical receiver 100 in the present exemplary embodiment, even if a skew arises between the lanes, it becomes possible to achieve sufficient demodulation and thus to suppress deterioration of reception performance.

The present invention is not limited to the above-mentioned exemplary embodiments and can be variously modified within the scope of the invention described in the claims. It goes without saying that these modifications are also included in the scope of the invention.

This application is based upon and claims the benefit of priority from Japanese patent application No. 2010-284309 filed on Dec. 21, 2010, the disclosure of which is incorporated herein in its entirety by reference.

DESCRIPTION OF THE CODES

100 coherent optical receiver.
110 local light source.
120 90-degree hybrid circuit (90-deg hybrid)
130 optoelectronic converter (ME)
140 analog-to-digital converter (ADC)
150 skew addition unit
160, 161 FFT operation unit (FFT)
162 switch unit
170 test light source
180 control block
181, 186 peak detection unit
182 skew calculation unit
183 absolute value calculation unit
184 skew amount holding unit
185 set skew amount controller
600 related coherent optical receiver
610 local light source
620 90-degree hybrid circuit (90-deg hybrid).
630 optoelectronic converter (ME)
640 analog-to-digital converter (ADC)
650 digital signal processing unit (DSP).
1000, 1100, 1200 device for detecting inter-lane skew in coherent optical receiver

The invention claimed is:
1. A coherent optical receiver, comprising:
a local light source;
a 90-degree hybrid circuit;
an optoelectronic converter;
an analog-to-digital converter;
a skew addition unit; and
a FFT operation unit, wherein
the 90-degree hybrid circuit makes multiplexed signal light interfere with local light from the local light source, and outputs a plurality of optical signals separated into a plurality of signal components;
the optoelectronic converter detects the plurality of optical signals and outputs a plurality of detected electrical signals;
the analog-to-digital converter digitizes the plurality of detected electrical signals and outputs a plurality of detected digital signals;
the skew addition unit adds to at least one of the plurality of detected digital signals an additional skew amount whose absolute value is equal to, whose sign is opposite to a skew amount of a difference in propagation delay in each lane connected to each output channel of the 90-degree hybrid circuit; and
the FFT operation unit performs a fast Fourier transform process on a signal output from the skew addition unit;

wherein the skew amount is calculated from peak information including a frequency at a peak frequency component included in FFT data obtained by performing the fast Fourier transform process and information on a phase angle at the frequency.

2. A device for detecting inter-lane skew in a coherent optical receiver, comprising:
a coherent optical receiver;
a test light source; and
a control block, wherein
the coherent optical receiver comprises a local light source, a 90-degree hybrid circuit, an optoelectronic converter, an analog-to-digital converter, a skew addition unit, and a FFT operation unit, wherein
the 90-degree hybrid circuit makes multiplexed signal light interfere with local light from the local light source, and outputs a plurality of optical signals separated into a plurality of signal components;
the optoelectronic converter detects the plurality of optical signals and outputs a plurality of detected electrical signals;
the analog-to-digital converter digitizes the plurality of detected electrical signals and outputs a plurality of detected digital signals;
the skew addition unit adds a predetermined additional skew amount to at least one of the plurality of detected digital signals;
the FFT operation unit outputs FFT data obtained by performing a fast Fourier transform process on a signal output from the skew addition unit; and
the control block calculates, from the FFT data, a skew amount of a difference in propagation delay in each lane connected to each output channel of the 90-degree hybrid circuit, and sets a value, whose absolute value is equal to, whose sign is opposite to the skew amount, for an additional skew amount in the skew addition unit;
wherein the skew amount is calculated from peak information including a frequency at a peak frequency component included in the FFT data obtained by performing the fast Fourier transform process and information on a phase angle at the frequency.

3. The device for detecting inter-lane skew in a coherent optical receiver according to claim 2,
wherein the control block comprises a peak detection unit, a skew calculation unit, an absolute value calculation unit, a skew amount holding unit, and a set skew amount controller;
the peak detection unit inputs the FFT data, calculates the peak information including the frequency at the peak frequency component included in the FFT data and the information on the phase angle at the frequency, and outputs the peak information to the skew calculation unit;
the skew calculation unit calculates the skew amount on the basis of the peak information and outputs the skew amount to the absolute value calculation unit;
the absolute value calculation unit calculates an absolute value of the skew amount;
the skew amount holding unit inputs and holds the absolute value of the skew amount, and calculates a calculated skew amount by adding a sign to the absolute value of the skew amount; and
the set skew amount controller sets a value, whose absolute value is equal to, whose sign is opposite to the calculated skew amount, for an additional skew amount in the skew addition unit.

4. The device for detecting inter-lane skew in a coherent optical receiver according to claim 3,
wherein the FFT operation unit, inputting real part input data and imaginary part input data, is connected to two output signal lanes of output signal lanes corresponding to output channels of the 90-degree hybrid circuit, and puts one output signal from the two output signal lanes at the real part input data and puts the other output signal from the two output signal lanes at the imaginary part input data.

5. The device for detecting inter-lane skew in a coherent optical receiver according to claim 3,
wherein the FFT operation unit is connected to two output signal lanes of output signal lanes corresponding to output channels of the 90-degree hybrid circuit, and comprises a switch unit disposed between the skew addition unit and the FFT operation unit in any one output signal lane of the two output signal lanes;
wherein the switch unit outputs a value of zero in a non-operating state, and outputs an input data without change in an operating state.

6. The device for detecting inter-lane skew in a coherent optical receiver according to claim 2,
wherein the FFT operation unit, inputting real part input data and imaginary part input data, is connected to two output signal lanes of output signal lanes corresponding to output channels of the 90-degree hybrid circuit, and puts one output signal from the two output signal lanes at the real part input data and puts the other output signal from the two output signal lanes at the imaginary part input data.

7. The device for detecting inter-lane skew in a coherent optical receiver according to claim 2,
wherein the FFT operation unit is connected to two output signal lanes of output signal lanes corresponding to output channels of the 90-degree hybrid circuit, and comprises a switch unit disposed between the skew addition unit and the FFT operation unit in any one output signal lane of the two output signal lanes;
wherein the switch unit outputs a value of zero in a non-operating state, and outputs an input data without change in an operating state.

8. A method for detecting inter-lane skew in a coherent optical receiver, comprising the steps of:
making test light from a test light source interfere with local light from a local light source, and outputting a plurality of optical signals separated into a plurality of signal components;
detecting the plurality of optical signals and outputting a plurality of detected electrical signals;
digitizing the plurality of detected electrical signals and outputting a plurality of detected digital signals;
performing a fast Fourier transform process on the plurality of detected digital signals;
calculating an absolute value of a skew amount corresponding to a difference in propagation delay between at least two of the plurality of signal components from the results of the fast Fourier transform process; and
determining a sign of the skew amount;
wherein the skew amount is calculated from peak information including a frequency at a peak frequency component included in FFT data obtained by performing the fast Fourier transform process and information on a phase angle at the frequency.

9. The method for detecting inter-lane skew in a coherent optical receiver according to claim 8, further comprising:
in the step of determining the sign of the skew amount, holding the absolute value of the skew amount;
calculating a skew compensation amount, whose absolute value is equal to, whose sign is opposite to the skew amount;
calculating an absolute value of a second skew amount from the results of having performed the fast Fourier transform process adding the skew compensation amount to the detected digital signal;
comparing an absolute value of the skew amount being held with the absolute value of the second skew amount in magnitude;
reversing the sign of the skew amount being held if the absolute value of the second skew amount being determined to be larger; and
keeping the sign of the skew amount being held without change if the absolute value of the second skew amount being determined to be equal to or smaller than the absolute value of the skew amount.

10. The method for detecting inter-lane skew in a coherent optical receiver according to claim 9, further comprising:
in the step of calculating the absolute value of the skew amount,
calculating a peak frequency and a peak phase at the maximum value in the results of the fast Fourier transform process for each of the plurality of signal components; and
setting the absolute value of the skew amount equal to a gradient of a linear function, by which a difference between the peak phase corresponding to each of the plurality of signal components is approximated against the peak frequency.

11. The method for detecting inter-lane skew in a coherent optical receiver according to claim 8, further comprising:
in the step of calculating the absolute value of the skew amount,
calculating a peak frequency and a peak phase at the maximum value in the results of the fast Fourier transform process for each of the plurality of signal components; and
setting the absolute value of the skew amount equal to a gradient of a linear function, by which a difference between the peak phase corresponding to each of the plurality of signal components is approximated against the peak frequency.

12. A coherent optical receiver, comprising:
a 90-degree hybrid circuit having plural outputs each communicating with a respective one of plural optical fibers;
an optoelectronic converter having plural inputs each communicating with a respective one of said plural optical fibers, and plural outputs each communicating with a respective one of plural wires;
an analog-to-digital converter having plural inputs each communicating with a respective one of said plural wires, and plural outputs;
a skew addition unit configured to add to a signal carried by at least one of the plural outputs of the analog-to-digital converter a predetermined skew amount to offset propagation delays imparted to the signal by differences in path length among said plural optical fibers and said plural wires; and
an FFT operation unit that performs a fast Fourier transform process on signals output from the skew addition unit;
wherein an absolute value of the predetermined skew amount corresponds to differences in the results of the fast Fourier transform process;
wherein the skew amount is calculated from peak information including a frequency at a peak frequency component included in FFT data obtained by performing the fast Fourier transform process and information on a phase angle at the frequency.

13. The coherent optical receiver according to claim 12, further comprising a control block that receives data output from said FFT operation unit and calculates, from the FFT data, said predetermined skew amount, and outputs to said skew addition unit a signal indicative of said predetermined skew amount.

14. The coherent optical receiver according to claim 13, wherein said control block comprises a peak detection unit and a skew calculation unit;
the peak detection unit receives data output from said FFT operation unit, calculates the peak information including the frequency at the peak frequency component included in the FFT data and the information on the phase angle at the frequency, and outputs the peak information to the skew calculation unit; and
the skew calculation unit calculates the predetermined skew amount on the basis of the peak information.

* * * * *